(12) United States Patent
Erlandsson et al.

(10) Patent No.: US 11,871,883 B2
(45) Date of Patent: Jan. 16, 2024

(54) NONWOVEN FABRIC WITH IMPROVED HAND-FEEL

(71) Applicant: AVINTIV Specialty Materials Inc., Charlotte, NC (US)

(72) Inventors: Sven Krister Erlandsson, Advance, NC (US); Jerry Snider, Mooresville, NC (US); Albert G. Dietz, III, Davidson, NC (US); Pierre Grondin, Mooresville, NC (US); Ralph A. Moody, III, Mooresville, NC (US)

(73) Assignee: AVINTIV Specialty Materials Inc., Charlotte, NC (US)

( * ) Notice: Subject to any disclaimer, the term of this patent is extended or adjusted under 35 U.S.C. 154(b) by 225 days.

(21) Appl. No.: 15/398,952

(22) Filed: Jan. 5, 2017

(65) Prior Publication Data

US 2017/0196414 A1    Jul. 13, 2017

Related U.S. Application Data

(60) Provisional application No. 62/276,391, filed on Jan. 8, 2016.

(51) Int. Cl.
*A47K 7/02* (2006.01)
*B32B 5/04* (2006.01)
(Continued)

(52) U.S. Cl.
CPC ............... *A47K 7/02* (2013.01); *B32B 5/022* (2013.01); *B32B 5/04* (2013.01); *B32B 5/08* (2013.01);
(Continued)

(58) Field of Classification Search
CPC ........................................................ A47K 7/02
See application file for complete search history.

(56) References Cited

U.S. PATENT DOCUMENTS 3,485,706 A * 12/1969 Evans ................... D04H 18/04
428/134
5,470,639 A * 11/1995 Gessner ................... D01F 6/46
156/161
(Continued)

FOREIGN PATENT DOCUMENTS

CN         1097117 C      12/2002
CN       101848807 A       9/2010
(Continued)

OTHER PUBLICATIONS

International Search Report and Written Opinion of corresponding International Application No. PCT/US2017/012283, dated Mar. 23, 2017, all enclosed pages cited.
(Continued)

*Primary Examiner* — Andrew T Piziali
(74) *Attorney, Agent, or Firm* — BURR & FORMAN LLP

(57) ABSTRACT

Nonwoven fabrics having desirable wiping properties while also providing pleasant tactile properties are provided. The nonwoven fabrics may include a first nonwoven outer layer, a second nonwoven outer layer, and a core layer located between the first nonwoven layer and the second nonwoven outer layer. At least one of the first nonwoven outer layer and the second nonwoven outer layer may include a plurality of blended filaments comprising a blend of a polymer and an elastomeric polyolefin.

15 Claims, 3 Drawing Sheets

(51) Int. Cl.
  *D04H 3/007* (2012.01)
  *D04H 1/425* (2012.01)
  *D04H 1/559* (2012.01)
  *D04H 1/4291* (2012.01)
  *B32B 7/12* (2006.01)
  *B32B 5/08* (2006.01)
  *B32B 5/02* (2006.01)
  *B32B 5/26* (2006.01)
  *B32B 37/20* (2006.01)
  *D04H 1/70* (2012.01)

(52) U.S. Cl.
  CPC ............... *B32B 5/26* (2013.01); *B32B 7/12* (2013.01); *B32B 37/20* (2013.01); *D04H 1/425* (2013.01); *D04H 1/4291* (2013.01); *D04H 1/559* (2013.01); *D04H 1/70* (2013.01); *D04H 3/007* (2013.01); *B32B 2250/03* (2013.01); *B32B 2250/20* (2013.01); *B32B 2250/40* (2013.01); *B32B 2260/023* (2013.01); *B32B 2262/0207* (2013.01); *B32B 2262/0253* (2013.01); *B32B 2262/0261* (2013.01); *B32B 2262/0276* (2013.01); *B32B 2262/062* (2013.01); *B32B 2262/067* (2013.01); *B32B 2262/12* (2013.01); *B32B 2262/14* (2013.01); *B32B 2307/54* (2013.01); *B32B 2307/702* (2013.01); *B32B 2307/704* (2013.01); *B32B 2307/718* (2013.01); *B32B 2307/746* (2013.01); *B32B 2323/00* (2013.01); *B32B 2432/00* (2013.01); *B32B 2555/00* (2013.01)

(56) References Cited

U.S. PATENT DOCUMENTS

| | | | | |
|---|---|---|---|---|
| 6,028,018 | A * | 2/2000 | Amundson | B32B 5/26 |
| | | | | 442/381 |
| 6,361,784 | B1 | 3/2002 | Brennan et al. | |
| 6,680,423 | B1 | 1/2004 | Tanzer | |
| 7,132,025 | B2 | 11/2006 | Dittmar | |
| 7,914,723 | B2 | 3/2011 | Kim et al. | |
| 2002/0023710 | A1 * | 2/2002 | Tange | A61F 13/15699 |
| | | | | 156/229 |
| 2005/0133174 | A1 * | 6/2005 | Gorley | D04H 1/54 |
| | | | | 162/108 |
| 2006/0121099 | A1 * | 6/2006 | Solarek | C08L 3/06 |
| | | | | 424/443 |
| 2007/0197117 | A1 | 8/2007 | Austin et al. | |
| 2009/0068422 | A1 | 3/2009 | Pascavage | |
| 2010/0124864 | A1 | 5/2010 | Dharmarajan et al. | |
| 2010/0196672 | A1 * | 8/2010 | Bonneh | B32B 7/08 |
| | | | | 428/174 |
| 2010/0222755 | A1 * | 9/2010 | Westwood | B32B 5/06 |
| | | | | 604/358 |
| 2011/0275265 | A1 * | 11/2011 | Smith | D01F 8/16 |
| | | | | 442/192 |

FOREIGN PATENT DOCUMENTS

| | | |
|---|---|---|
| EP | 0914509 B1 | 8/2003 |
| JP | 2003520307 A | 7/2003 |
| JP | 2009527660 A | 7/2009 |
| JP | 2015536720 A | 12/2015 |
| WO | 2009032868 A1 | 3/2009 |

OTHER PUBLICATIONS

Second Written Opinion of corresponding international application No. PCT/US2017/012283 dated Dec. 12, 2017, all enclosed pages cited.
Office Action issued in corresponding Canadian Application No. 3,010,787 dated Feb. 21, 2020, all enclosed pages cited.
Office Action for Japanese Application No. 2018-535338 dated Aug. 20, 2019, all enclosed pages cited.
English Translation of Office Action for Japanese Application No. 2018-535338 dated Aug. 20, 2019, all enclosed pages cited.
Office Action for Korean Application No. 10-2018-7022238 dated Jun. 20, 2019, all enclosed pages cited.
Examination Report No. 1 for Australian Application No. 2017205991 dated May 2, 2019, all enclosed pages cited.
Second Office Action issued in corresponding Korean Application No. 10-2018-7022238 dated Mar. 30, 2020, all enclosed pages cited.
Office Action issued in corresponding Chinese Application No. 2017800156204 dated Jun. 2, 2020, all enclosed pages cited.
Translation of Office Action issued in corresponding Chinese Application No. 2017800156204 dated Jun. 2, 2020, all enclosed pages cited.
Third Office Action issued in corresponding Canadian application No. 3,010,787 dated Jul. 31, 2020, all enclosed pages cited.
Notice of Allowance issued in corresponding Korean application No. 10-2018-7022238 dated Sep. 24, 2020, all enclosed pages cited.
Second Office Action issued in corresponding Chinese application No. 2017800156204 dated Jan. 15, 2021, all enclosed pages cited.
Fourth Office Action issued in corresponding Canadian application No. 3,010,787 dated Jan. 19, 2021, all enclosed pages cited.
Reasons for Refusal issued in corresponding Korean application No. 10-2020-7035677 dated Mar. 10, 2021, all enclosed pages cited.
Examination Report No. 1 issued in corresponding Australian application No. 2020213377 dated Sep. 28, 2021, all enclosed pages cited.
Decision of Rejection issued in corresponding Chinese application No. 201780015620.4 dated Jul. 14, 2021, all enclosed pages cited.
Communication pursuant to Article 94(3) EPC issued in corresponding European application No. 17700763.0 dated Apr. 12, 2021, all enclosed pages cited.
Second Office Action issued in corresponding Korean application No. 10-2020-7035677 dated Nov. 1, 2021, all enclosed pages cited.

* cited by examiner

NONWOVEN FABRIC WITH IMPROVED HAND-FEEL

PRIORITY CLAIM

This application claims priority under 35 U.S.C. § 119(e) to U.S. Provisional Application Ser. No. 62/276,391, filed on Jan. 8, 2016, which is expressly incorporated by reference herein in its entirety.

TECHNICAL FIELD

The presently-disclosed invention relates generally to nonwoven fabrics that provide desirable wiping properties as well as pleasant tactile properties, in which that outermost surfaces are generally free of cellulosic fibers and include filaments comprising an elastomeric polyolefin.

BACKGROUND

Traditionally wet wipes used for personal care have been principally made by hydroentangling a blend of cellulosic and thermoplastic fibers or, by the coform process where wood pulp fibers and meltblown fibers are comingled into a stable web. In both cases cellulosic fibers are present at a substantial concentration at the surface of the wipe and conferring a pleasant feel normally associated with traditional cellulosic-based textiles like a cotton facecloth. The issue with these approaches is that the former is relatively expensive while the second lacks adequate abrasion resistance.

In an effort to achieve a good balance of absorbency, abrasion resistance, and low cost, people have tried to combine polypropylene based spunbond webs with low cost cellulosic fibers, such as wood pulp fibers. However, such structures sometime have mainly polypropylene filaments exposed on one or both of their outer surfaces. As such, these structures do not produce a pleasant sensorial experience to a user because the lotion or fluid used with a personal care product formed of such structures lubricate the smooth surface of the polypropylene fibers to the point where they feel slick or slippery, which is not typically experienced with the textured surface of cellulosic fibers. This slick or slippery feel can be sometimes experienced with Spinlace® fabrics that comprise a layer of wood pulp fibers captured between two spunbond layers and subsequently hydro-entangled. The slick or slippery feel of these hydro-entangled composite is associated with one of the faces having no or little wood pulp fibers on its surface. An additional method for forming nonwoven fabrics suitable for wipes is known as the Arvell technology and developed by Teknoweb (Italy). With this technology, the web produced typically comprises a middle layer comprising wood pulp fibers and continuous filaments and two outer layers made from continuous filaments. The continuous filaments typically are made from a polyolefin and more commonly, from polypropylene. In this case of the Spinlace® fabrics as well as those made by the Arvell technology, the outermost surfaces have little wood pulp fiber exposed and tend to undesirably feel slick or slippery when they are used as wet wipes.

Further, there are instances or applications where it is desirable to have a wipe (e.g., a wet wipe) that is free, at least in its outer layers, of cellulosic fibers. For instance, some disinfectant wipes include a sanitizer that can react with the cellulosic fiber. Wipes used for clean rooms or medical applications where linting is very undesirable are additional applications in which wipes are needed without cellulosic fibers (or at least in the wipes outermost layers). Wipes made of thermoplastic polymer that are free of cellulosic fibers on at least one of their surfaces, however, are often associated with poorer performance at picking up fine debris and at streaking (i.e., leaving some liquid behind when wiping a surface).

Therefore, there remains a need in the art for cost effective nonwoven fabrics suitable for use as a wipe (e.g., a wet wipe) with a substantial amount of thermoplastic fibers on the exposed surfaces, while exhibiting good wiping performance as well as pleasant tactile properties.

SUMMARY OF INVENTION

One or more embodiments of the invention may address one or more of the aforementioned problems. Certain embodiments according to the invention provide nonwoven fabrics including a core layer and at least one, such as two, outer nonwoven layers. For instance, the nonwoven fabrics may comprise a core layer located between two nonwoven outer layers in which at least one of the outer layers includes an elastomeric polyolefin and/or is, for example, mostly devoid of cellulosic fibers. Such nonwoven fabrics may be suitable for a wide variety of applications, including as dry wipes (e.g., which may be used in a dry state or submerged in a liquid cleaning composition on-site) and wet wipes (e.g., pre-loaded or pre-moistened fabrics including a liquid thereon).

In one aspect, the invention provides nonwoven fabrics (e.g., wipes) including a first nonwoven outer layer, a second nonwoven outer layer; and a core layer located directly or indirectly between the first nonwoven layer and the second nonwoven outer layer. In accordance with certain embodiments of the invention, the at least one of the first nonwoven outer layer and the second nonwoven outer layer includes a plurality of blended filaments comprising a blend of a polymer and an elastomeric polyolefin. In accordance with certain embodiments of the invention, the blended filaments may comprise thermoplastic fibers of continuous length (e.g., spunbond filaments), non-continuous length (e.g., staple fibers), or both. In certain embodiments of the invention, for example, the first nonwoven outer layer and the second nonwoven outer layer may each include blended filaments (e.g., continuous blended filaments and/or blended staple fibers). In accordance with certain embodiments of the invention, the core layer comprises cellulosic fibers. In addition to cellulosic fibers, the core layer may also comprise polymeric fibers, such as continuous polymeric fibers, according to certain embodiments of the invention. In this regard, the core layer may comprise a combination of continuous polymeric fibers and cellulosic fibers. In accordance with certain embodiments of the invention, for example, the core layer may comprise from about 25 wt. % to about 100 wt. % of cellulosic fibers or from about 50 wt. % to about 100 wt. % of cellulosic fibers. In one example embodiment according to the invention, the nonwoven fabric may comprise a core layer comprising 100 wt. % of cellulosic fibers (e.g., wood pulp). The cellulosic fibers of the core layer, according to certain embodiments of the invention, may comprise short and/or staple fibers. In accordance with certain embodiments of the invention, the core layer may comprise one or more individual or discrete cellulosic fiber-containing layers. For example, the core layer may comprises from about 1 to about 5 individual cellulosic fiber-containing layers (e.g., 1, 2, 3, 4, or 5 individual layers).

In accordance with certain embodiments of the invention, the core layer of the nonwoven fabric may comprise a core layer ratio between a weight percentage of cellulosic fibers to a weight percentage of polymer fibers from about 4:1 to 1:1. The core layer ratio between a weight percentage of cellulosic fibers to a weight percentage of polymer fibers, according to certain embodiments of the invention, may comprise from about 3.5:1 to 2.5:1 (e.g., 3.5:1 to 3:1). According to certain embodiments of the invention, the core layer may comprise from about 60 wt. % to about 90 wt. % of the nonwoven fabric (e.g., from about 70 wt. % to about 90 wt. % of the nonwoven fabric). In accordance with certain other embodiments of the invention, the core layer may comprise substantially 100 percent of a thermoplastic polymer. In this regard, the core layer according to certain embodiments of the invention may be devoid of cellulosic fibers. The nonwoven fabric, according to certain embodiments of the invention, may be devoid of cellulosic fibers. In accordance with certain embodiments of the invention, the core layer, the nonwoven fabric, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

Nonwoven fabrics, according to certain embodiments of the invention, may comprise at least the first nonwoven outer layer including blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin. In accordance with certain embodiments of the invention, the blended filaments may comprise from about 20 wt. % to about 50 wt. % of the elastomeric polyolefin. In accordance with certain embodiments of the invention, the blended filaments may comprise from about 30 wt. % to about 40 wt. % of the elastomeric polyolefin (e.g., about 35 wt. % of the elastomeric polyolefin). In accordance with certain embodiments of the invention, each of the first nonwoven outer layer and the second nonwoven outer layer comprise blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin (e.g., from about 20 wt. % to about 50 wt. % of the elastomeric polyolefin, from about 30 wt. % to about 40 wt. % of the elastomeric polyolefin, about 35 wt. % of the elastomeric polyolefin). In accordance with certain embodiments of the invention, the elastomeric polyolefin comprises copolymers of propylene and ethylene. In certain embodiments of the invention, for example, the elastomeric polyolefin may comprise polypropylene microcrystalline regions and random ethylene amorphous regions.

In accordance with certain embodiments of the invention, the first nonwoven outer layer, the second nonwoven outer layer, or both, may comprise spunbond filaments. For instance, the blended filaments may comprise spunbond filaments (e.g., continuous filaments). In certain example embodiments of the invention, at least one of the first nonwoven outer layer and the second nonwoven outer layer may include a plurality of blended filaments (e.g., continuous blended filaments and/or blended staple fibers) comprising a blend of a polymer and an elastomeric polyolefin, in which the polymer comprises at least one of a polyolefin, a polyester, a polyamide, or combinations thereof. In accordance with certain embodiments of the invention, the polymer comprises a polypropylene.

In accordance with certain embodiments of the invention, the first nonwoven outer layer, the second nonwoven outer layer, or both, may be substantially devoid of cellulosic fibers (e.g., devoid of cellulosic fibers). In accordance with certain embodiments of the invention, the first nonwoven outer layer, the second nonwoven outer layer, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. Additionally or alternatively, the first nonwoven outer layer may define a first outermost surface of the nonwoven fabric and the second nonwoven outer layer may define a second outermost surface of the nonwoven fabric, in which the first outermost surface, the second outermost surface, or both may be substantially devoid of cellulosic fibers (e.g., devoid of cellulosic fibers). In accordance with certain embodiments of the invention, the first outermost surface, the second outermost surface, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

In accordance with certain embodiments of the invention, the nonwoven fabric may comprise a liquid additive loaded thereon. The liquid additive, for example, may not be particularly limited according to certain embodiments of the invention. In certain embodiments of the invention, for instance, the liquid additive may comprise a lotion, soil-cleaning compositions, skin-cleaning composition, or anti-microbial composition. In this regard, certain embodiments of the invention may comprise a preloaded wet-wipe, for example being disposed within a container or package.

The nonwoven fabric, in accordance with certain embodiments of the invention, may comprise a basis weight from about 20 to about 100 gsm. The basis weight of the nonwoven fabric, according to certain embodiments of the invention, may comprise from about 40 to about 60 gsm. In certain embodiments of the invention, for example, the nonwoven fabric may comprise a basis weight from about 40 gsm to about 50 gsm.

In another aspect, the present invention provides a method of forming a nonwoven fabric as disclosed herein. In accordance with certain embodiments of the invention, the method of forming a nonwoven fabric may comprise steps of providing a first nonwoven outer layer, providing a second nonwoven outer layer, providing a core layer, positioning the core layer between the first nonwoven layer and the second nonwoven outer layer to form a composite web, and bonding the composite web to form the nonwoven fabric; wherein at least one of the first nonwoven outer layer and the second nonwoven outer layer includes a plurality of blended filaments comprising a blend of a polymer and an elastomeric polyolefin. In accordance with certain embodiments of the invention, the blended filaments may comprise thermoplastic fibers of continuous length (e.g., spunbond filaments), non-continuous length (e.g., staple fibers), or both. In accordance with certain embodiments of the invention, the step of providing a first nonwoven outer layer may comprise melt-spinning the first nonwoven layer. In accordance with certain embodiments of the invention, the step of providing a second nonwoven outer layer may comprises melt-spinning the second nonwoven layer. In accordance with certain embodiments of the invention, the step of providing a core layer may comprise melt-spinning the core layer. Methods of forming a nonwoven fabric as disclosed herein, in accordance with certain embodiments of the invention, may comprise, for example, melt-spinning the first nonwoven layer onto a forming belt, melt-spinning or otherwise forming the core layer onto the first nonwoven outer layer, melt-spinning the second nonwoven layer onto the core layer to form a composite nonwoven, and bonding the composite nonwoven to form a nonwoven fabric as disclosed herein.

In accordance with certain embodiments of the invention, the nonwoven composite may be bonded by a variety of operations, such as thermal bonding, adhesive bonding, mechanical bonding, ultrasonic bonding, or the like. Bonding of the nonwoven composite, according to certain embodiments of the invention, may comprise thermal bonding via a calender.

In accordance with certain method embodiments of the invention, at least one of the first nonwoven outer layer and the second nonwoven outer layer includes a plurality of blended filaments (e.g., continuous blended filaments and/or blended staple fibers) comprising a blend of a polymer and an elastomeric polyolefin. In certain embodiments of the invention, for example, the first nonwoven outer layer and the second nonwoven outer layer may each include blended filaments (e.g., continuous blended filaments and/or blended staple fibers). In accordance with certain embodiments of the invention, the core layer comprises cellulosic fibers. In addition to cellulosic fibers, the core layer may also comprise polymeric fibers, such as continuous polymeric fibers, according to certain embodiments of the invention. In this regard, the core layer may comprise a combination of continuous polymeric fibers and cellulosic fibers. In accordance with certain embodiments of the invention, for example, the core layer may comprise from about 25 wt. % to about 100 wt. % of cellulosic fibers or from about 50 wt. % to about 80 wt. % of cellulosic fibers. In one example embodiment according to the invention, the nonwoven fabric may comprise a core layer comprising 100 wt. % of cellulosic fibers (e.g., wood pulp). The cellulosic fibers of the core layer, according to certain embodiments of the invention, may comprise short and/or staple fibers. In accordance with certain embodiments of the invention, the core layer may comprise one or more individual or discrete cellulosic fiber-containing layers. For example, the core layer may comprises from about 1 to about 5 individual cellulosic fiber-containing layers (e.g., 1, 2, 3, 4, or 5 individual layers). In accordance with certain embodiments of the invention, the cellulosic fibers can be added and/or combined with polymeric filaments (e.g., melt-spun filaments) to provide polymeric fibers and cellulosic fibers, in which the cellulosic fibers may be at least partially bonded to the polymeric fibers and/or at least partially incorporated into the polymeric fibers.

In accordance with certain method embodiments of the invention, the core layer of the nonwoven fabric may comprise a core layer ratio between a weight percentage of cellulosic fibers to a weight percentage of polymer fibers from about 4:1 to 1:1. The core layer ratio between a weight percentage of cellulosic fibers to a weight percentage of polymer fibers, according to certain embodiments of the invention, may comprise from about 3.5:1 to 2.5:1 (e.g., 3.5:1 to 3:1). According to certain embodiments of the invention, the core layer may comprise from about 60 wt. % to about 90 wt. % of the nonwoven fabric (e.g., from about 70 wt. % to about 90 wt. % of the nonwoven fabric). In accordance with certain other embodiments of the invention, the core layer may comprise substantially 100 wt. % of a thermoplastic polymer. In this regard, the core layer according to certain embodiments of the invention may be devoid of cellulosic fibers. The nonwoven fabric, according to certain embodiments of the invention, may be devoid of cellulosic fibers. In accordance with certain embodiments of the invention, the core layer, the nonwoven fabric, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

In accordance to certain method embodiments of the invention, the resulting nonwoven fabric may comprise at least the first nonwoven outer layer including blended filaments (e.g., continuous blended filaments and/or blended staple fibers) comprising a blend of a polymer and an elastomeric polyolefin, in which the blended filaments (e.g., continuous blended filaments and/or blended staple fibers) comprise from about 10 wt. % to about 75 wt. % of the elastomeric polyolefin. In accordance with certain embodiments of the invention, the blended filaments may comprise from about 20 wt. % to about 50 wt. % of the elastomeric polyolefin. In accordance with certain embodiments of the invention, the blended filaments may comprise from about 30 wt. % to about 40 wt. % of the elastomeric polyolefin (e.g., about 35 wt. % of the elastomeric polyolefin). In accordance with certain embodiments of the invention, each of the first nonwoven outer layer and the second nonwoven outer layer comprise blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin (e.g., from about 20 wt. % to about 50 wt. % of the elastomeric polyolefin, from about 30 wt. % to about 40 wt. % of the elastomeric polyolefin, about 35 wt. % of the elastomeric polyolefin). In accordance with certain embodiments of the invention, the elastomeric polyolefin comprises copolymers of propylene and ethylene. In certain embodiments of the invention, for example, the elastomeric polyolefin may comprise polypropylene microcrystalline regions and random ethylene amorphous regions.

In accordance with certain method embodiments of the invention, the first nonwoven outer layer, the second nonwoven outer layer, or both, may comprise spunbond filaments (e.g., formed by a spunbond process). For instance, the blended filaments may comprise continuous spunbond filaments. In accordance with certain embodiments of the invention, at least one of the first nonwoven outer layer and the second nonwoven outer layer may include a plurality of blended filaments (e.g., continuous blended filaments and/or blended staple fibers) comprising a blend of a polymer and an elastomeric polyolefin, in which the polymer comprises at least one of a polyolefin, a polyester, a polyamide, or combinations thereof. In accordance with certain embodiments, the polymer comprises a polypropylene.

In accordance with certain method embodiments of the invention, the first nonwoven outer layer, the second nonwoven outer layer, or both, may be substantially devoid of cellulosic fibers. In accordance with certain embodiments of the invention, the first nonwoven outer layer, the second nonwoven outer layer, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. Additionally or alternatively, the first nonwoven outer layer may define a first outermost surface of the nonwoven fabric and the second nonwoven outer layer may define a second outermost surface of the nonwoven fabric, in which the first outermost surface, the second outermost surface, or both may be substantially devoid of cellulosic fibers. In accordance with certain embodiments of the invention, the first outermost surface, the second outermost surface, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

In accordance with certain method embodiments of the invention, the method may further comprise adding and/or incorporating a liquid additive loaded into or on the nonwoven fabric. The liquid additive, for example, may not be particularly limited according to certain embodiments of the invention. In certain embodiments of the invention, for instance, the liquid additive may comprise a lotion, soil-cleaning compositions, skin-cleaning composition, or antimicrobial composition. In this regard, certain embodiments of the invention may comprise a preloaded wet-wipe, for example being disposed within a container or package.

Methods in accordance with certain embodiments of the invention, may comprise forming a nonwoven fabric comprising a basis weight from about 20 to about 100 gsm. The basis weight of the nonwoven fabric, according to certain embodiments of the invention, may comprise from about 40 to about 60 gsm. In certain embodiments of the invention, for example, the nonwoven fabric may comprise a basis weight from about 40 gsm to about 50 gsm.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
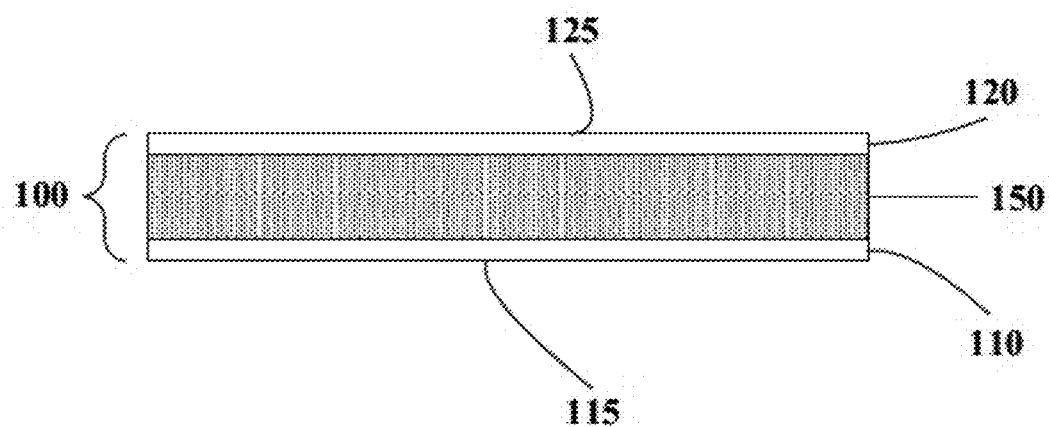
FIG. 1 illustrates a nonwoven fabric according to one embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The invention includes, according to certain embodiments, nonwoven fabrics that provide desirable wiping properties as well as pleasant tactile properties, in which a significant amount of thermoplastic fibers may form one or both exposed surfaces (e.g., the outermost surfaces) of the nonwoven fabrics. The thermoplastic fibers located at the outermost surface or surfaces of the nonwoven fabric may comprise a blend of a polymeric material and an elastomeric polyolefin. In accordance with certain embodiments of the invention, the exposed or outermost surfaces of the nonwoven fabrics may be generally free of cellulosic fibers. In accordance with certain embodiments of the invention, that nonwoven fabrics may comprise a core layer located between two nonwoven outer layers in which at least one of the outer layers includes an elastomeric polyolefin and/or is mostly devoid of cellulosic fibers. Nonwoven fabrics, according to certain embodiments of the invention, may be suitable for a variety of applications (e.g., end-uses), including as a dry wipes (e.g., which may be used in a dry state or submerged in a liquid cleaning composition on-site) or as a wet wipe (e.g., a wipe structure pre-loaded with a liquid).

The terms "substantial" or "substantially" may encompass the whole amount as specified, according to certain embodiments of the invention, or largely but not the whole amount specified according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "elastomer" or "elastomeric", as used interchangeably herein, may comprise any material that upon application of a biasing force, can stretch to an elongated length of at least 110% or even to 125% of its relaxed, original length (i.e., can stretch to at least 10% or even 25% more than its original length), without rupture or breakage. Upon release of the applied force, for example, the material may recover at least 40%, at least 60%, or even at least 80% of its elongation. In certain embodiments of the invention, the material may recover from about 20% to about 100% of its elongation, from about 25% to about 95% of its elongation, from about 30% to about 90% of its elongation, from about 40% to about 80% of its elongation, or from about 50% to about 70% of its elongation. For example, a material that has an initial length of 100 mm can extend at least to 110 mm, and upon removal of the force would retract to a length of 106 mm (e.g., exhibiting a 40% recovery). Exemplary elastomers may include Vistamaxx™ propylene-based elastomers (commercially available form ExxonMobile), which comprise copolymers of propylene and ethylene. Vistamaxx™ propylene-based elastomers, for example, comprise isotactic polypropylene microcrystalline regions and random amorphous regions.

The term "blended filaments", as used herein, may comprise filaments formed from a melt-blend comprising a blend of one or more polymers (e.g., non-elastomeric polymer) and one or more elastomeric polyolefin. In this regard, a melt-blend may be formed from one or more polymers (e.g., non-elastomeric polymer) and at least one elastomeric polyolefin inter-mixed at a temperature suitable for melt-spinning individual filaments composed of both the polymeric and elastomeric components in the melt-blend. In accordance with certain embodiments of the invention, "blended filaments" may comprise a continuous length, which may be referred to as "continuous blended filaments" herein, or a non-continuous length (e.g., staple fibers), which may be referred to as "blended staple fibers" herein.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "layer", as used herein, may comprise a generally recognizable combination of similar material types and/or functions existing in the X-Y plane.

The term "staple fiber", as used herein, may comprise a cut fiber from a filament. In accordance with certain embodiments, any type of filament material may be used to form staple fibers. For example, staple fibers may be formed from cellulosic fibers, polymeric fibers, and/or elastomeric fibers. Examples of materials may comprise cotton, rayon, wool, nylon, polypropylene, and polyethylene terephthalate. The average length of staple fibers may comprise, by way of example only, from about 2 centimeter to about 15 centimeter.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include a nonwoven described in the literature as SPIN-LACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "hydroentangle" or "hydroentangled", as used herein, may comprise a process for bonding a nonwoven fabric by using high pressure water jets to intermingle the fibers. Several rows of water jets are directed against the fiber web, which is supported by a movable fabric. Fiber entanglements are introduced by the combined effects of the water jets and the turbulent water created in the web, which intertwines neighboring fibers.

As used herein, the terms "consolidation" and "consolidated" may comprise the bringing together of at least a portion of the fibers of a nonwoven web into closer proximity or attachment there-between (e.g., fused together) to form a bonding site, or bonding sites, which function to increase the resistance of the nonwoven to external forces (eg., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., fused together), such as by thermal bonding as merely one example. Such a web may be considered a "consolidated nonwoven" according to certain embodiments of the invention. Additionally, a specific, discrete region of fibers that is brought into close proximity or attachment there-between (e.g., fused together), such as an individual bond site, can be described as "consolidated".

In accordance with certain embodiments of the invention, consolidation may be achieved by methods that apply, for example, heat and/or pressure to the fibrous web (e.g., nonwoven web) via one or more embossing rolls or using a stream of hot fluid (e.g., through-air bonding). One non-limiting and exemplary method comprises thermal bonding. Thermal bonding can be accomplished by passing the fibrous web (e.g., nonwoven web) through a pressure nip formed by two rolls, one of which comprising an embossing roll which may be heated and contain a plurality of raised protrusions having one or more geometric shapes (e.g., points, diamond shaped, circular, elliptical, dog-bone shaped, etc.) on its surface which impart or form corresponding discrete thermal bond sites on the fibrous web (e.g., nonwoven web). Such an operating step, for example, may be referred to as "calendering." or "embossing" in which the nonwoven web is drawn between an embossing roll having an embossing pattern allowing only part of the web to become exposed to heat and pressure and a second roll (e.g., an anvil roll). The degree or extent of consolidation may be expressed as a percentage of the total surface area of the web that has been consolidated or subjected to consolidation and may be referred to as a "bonding area" or "consolidation area". Stated somewhat differently, the terms "bonding area" and "consolidated area", as used interchangeably herein, may comprise the area per unit area occupied by the localized sites formed by bonding the fibers into bond sites and may be expressed as a percentage of the total unit area of the consolidated nonwoven. For example, consolidated nonwovens (e.g., subjected to thermal bonding via an embossing roll) may comprise a plurality of discrete, spaced-apart bond sites or points (e.g., perimeter and internal bond sites or points) formed by bonding only the fibers of the nonwoven web in the area of localized energy input. Fibers or portions of fibers remote from the localized energy input remain substantially unbonded to adjacent fibers.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially constant position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

The term "cellulosic fiber", as used herein, may comprise fibers derived from hardwood trees, softwood trees, or a combination of hardwood and softwood trees prepared for use in, for example, a papermaking furnish and/or fluff pulp furnish by any known suitable digestion, refining, and bleaching operations. The cellulosic fibers may comprise recycled fibers and/or virgin fibers. Recycled fibers differ from virgin fibers in that the fibers have gone through the drying process at least once. In certain embodiments, at least a portion of the cellulosic fibers may be provided from non-woody herbaceous plants including, but not limited to, kenaf, cotton, hemp, jute, flax, sisal, or abaca. Cellulosic fibers may, in certain embodiments of the invention, comprise either bleached or unbleached pulp fiber such as high yield pulps and/or mechanical pulps such as thermo-mechanical pulping (TMP), chemical-mechanical pulp (CMP), and bleached chemical-thermo-mechanical pulp BCTMP. In this regard, the term "pulp", as used herein, may comprise cellulose that has been subjected to processing treatments, such as thermal, chemical, and/or mechanical treatments. Cellulosic fibers, according to certain embodiments of the invention, may comprise one or more pulp materials.

In accordance with certain embodiments of the invention, sources of the cellulose fibers may include, for example, from softwood and/or hardwood species. In one embodiment the source may comprise softwood. In another embodiment, the source may be at least 50 wt % (e.g., 50 wt. % to 95 wt %) softwood based upon the total weight of the cellulose fibers.

I. Nonwoven Fabrics

In one aspect, the invention provides nonwoven fabrics (e.g., wipes) including a first nonwoven outer layer, a second nonwoven outer layer; and a core layer located directly or indirectly (e.g., one or more additional layers may be positioned between the core layer and one or more of the outer nonwoven layers if so desired) between the first nonwoven layer and the second nonwoven outer layer. In accordance with certain embodiments of the invention, the at least one of the first nonwoven outer layer and the second nonwoven outer layer includes a plurality of blended filaments (e.g., continuous blended filaments and/or blended staple fibers) comprising a blend of a polymer and an elastomeric polyolefin. In certain embodiments of the invention, for example, the first nonwoven outer layer and the second nonwoven outer layer may each include blended filaments (e.g., continuous blended filaments and/or blended staple fibers). In accordance with certain embodiments of the invention, the core layer comprises cellulosic fibers. In addition to cellulosic fibers, the core layer may also comprise polymeric fibers, such as continuous polymeric fibers, according to certain embodiments of the invention. In this regard, the core layer may comprise a combination of continuous polymeric fibers and cellulosic fibers. In accordance with certain other embodiments of the invention, the core layer may be devoid or substantially devoid of cellulosic fibers. In accordance with certain embodiments of the invention, the nonwoven fabric may be devoid of cellulosic fibers.

FIG. 1, for example, illustrates a nonwoven fabric 100 according to one embodiment of the invention. As shown in FIG. 1, the nonwoven fabric 100 includes a first nonwoven outer layer 110 having a first outermost surface 115 and a second nonwoven outer layer 120 having a second outermost surface 125. The nonwoven fabric 100, as shown in FIG. 1, includes a core layer 150 positioned directly between the first nonwoven outer layer 110 and the second nonwoven outer layer 120.

In accordance with certain embodiments of the invention, for example, the core layer may comprise from about 25 wt. % to about 100 wt. % of cellulosic fibers or from about 50 wt. % to about 80 wt. % of cellulosic fibers. In accordance with certain embodiments of the invention, the core layer may comprise from at least about any of the following: 25 wt. %, 30 wt. %, 40 wt. %, 50 wt. %, 60 wt. %, 70 wt. %, and 75 wt. % of cellulosic fibers and/or at most about 100 wt. %, 99 wt. %, 95 wt. %, 90 wt. %, 85 wt. %, and 80 wt. % of cellulosic fibers (e.g., about 75-85 wt. % of cellulosic fibers, about 60-95 wt. % of cellulosic fibers, etc.). In one example embodiment according to the invention, the nonwoven fabric may comprise a core layer comprising substantially 100 wt. % of cellulosic fibers (e.g., wood pulp). In accordance with certain example embodiments of the invention, the nonwoven fabric may comprise, for example, two outer spunbond layers and a core layer comprising substantially 100 wt. % of cellulosic fibers (e.g., wood pulp). One or both of the outer spunbond layers, for example, may comprise Spinlace® layers and the core layer may comprise substantially 100 wt. % of cellulosic fibers (e.g., wood pulp).

The cellulosic fibers of the core layer, according to certain embodiments of the invention, may comprise short and/or staple fibers. In this regard, short fibers may comprise a length, for example, of less than 0.01 meter. In accordance with certain embodiments of the invention, the core layer may comprise one or more individual or discrete cellulosic fiber-containing layers. For example, the core layer may comprises from about 1 to about 5 individual cellulosic fiber-containing layers (e.g., 1, 2, 3, 4, or 5 individual layers). In accordance with certain embodiments of the invention, the core layer may comprise more than 1 individual cellulosic fiber-containing layer, including a first individual cellulosic fiber-containing layer and a second individual cellulosic fiber-containing layer in which the fiber-compositions (e.g., blends of thermoplastic fibers and cellulosic fibers) may comprise the same or different percentages of cellulosic fibers. In accordance with certain embodiments of the invention, the core layer may comprise at least three individual cellulosic fiber-containing layers, in which one of the layers has a higher cellulosic fiber content relative to the other individual cellulosic fiber-containing layers and being located at the innermost position of the core layer.

In accordance with certain embodiments of the invention, the core layer of the nonwoven fabric may comprise a core layer ratio between a weight percentage of cellulosic fibers to a weight percentage of polymer fibers from about 4:1 to 1:1. The core layer ratio between a weight percentage of cellulosic fibers to a weight percentage of polymer fibers, according to certain embodiments of the invention, may comprise from about 3.5:1 to 2.5:1 (e.g., 3.5:1 to 3:1). In accordance with certain embodiments of the invention, a core layer ratio between a weight percentage of cellulosic fibers to a weight percentage of polymer fibers may comprise from at least about any of the following: 1:1, 1.5:1, 2:1, 2.5:1, and 3:1 and/or at most about 5:1, 4.5:1, 4:1, and 3.5:1.

In accordance with certain other embodiments of the invention, the core layer may comprise substantially 100 wt. % of a thermoplastic polymer. In this regard, the core layer according to certain embodiments of the invention may be devoid of cellulosic fibers. The nonwoven fabric, according to certain embodiments of the invention, may be devoid of cellulosic fibers. In accordance with certain embodiments of the invention, the core layer, the nonwoven fabric, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. In accordance with certain example embodiments, the nonwoven fabric may comprise a spunbond-meltblown-spunbond structure, in which the number of meltblown layers positioned between the outer spunbond layers may be varied (e.g., from 1 to about 5), and the nonwoven fabric may be devoid of any cellulosic fibers.

According to certain embodiments of the invention, the core layer may comprise from about 60 wt. % to about 90 wt. % of the nonwoven fabric (e.g., from about 70 wt. % to about 90 wt. % of the nonwoven fabric). In accordance with certain embodiments of the invention, the core layer may comprise from at least about any of the following: 25 wt. %, 40 wt. %, 50 wt. %, 55 wt. %, 60 wt. %, 70 wt. %, and 75 wt. % of the nonwoven fabric and/or at most about 95 wt. %, 90 wt. %, 85 wt. %, and 80 wt. % of the nonwoven fabric.

Nonwoven fabrics, according to certain embodiments of the invention, may comprise at least the first nonwoven outer layer including blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin. In accordance with certain embodiments of the invention, the blended filaments may comprise from about 20 wt. % to about 50 wt. % of the elastomeric polyolefin. In accordance with certain embodiments of the invention, the blended filaments may comprise from about 30 wt. % to about 40 wt. % of the elastomeric polyolefin (e.g., about 35 wt. % of the elastomeric polyolefin). In accordance with certain embodiments of the invention, each of the first nonwoven outer layer and the second nonwoven outer layer comprise blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin (e.g., from about 20 wt. % to about 50 wt. % of the elastomeric polyolefin, from about 30 wt. % to about 40 wt. % of the elastomeric polyolefin, about 35 wt. % of the elastomeric polyolefin). In accordance with certain embodiments of the invention, the blended filaments (e.g., continuous blended filaments and/or blended staple fibers) of the first and/or second nonwoven outer layers may independently comprise from at least about any of the following: 10 wt. %, 15 wt. %, 20 wt. %, 25 wt. %, 30 wt. %, 35 wt. %, and 40 wt. % of the elastomeric polyolefin and/or at most about 85 wt. %, 80 wt. %, 75 wt. %, 70 wt. %, 65 wt. %, 60 wt. %, 55 wt. %, and 50 wt. % of the elastomeric polyolefin. In accordance with certain embodiments of the invention, the elastomeric polyolefin comprises copolymers of propylene and ethylene. In certain embodiments of the invention, for example, the elastomeric polyolefin may comprise polypropylene microcrystalline regions and random ethylene amorphous regions.

In accordance with certain embodiments of the invention, the first nonwoven outer layer, the second nonwoven outer layer, or both, may comprise continuous filaments (e.g., spunbond filaments). For instance, the blended filaments may comprise spunbond filaments. In accordance with certain embodiments of the invention, at least one of the first nonwoven outer layer and the second nonwoven outer layer may include a plurality of blended filaments (e.g., continuous blended filaments and/or blended staple fibers) comprising a blend of a polymer and an elastomeric polyolefin, in which the polymer comprises at least one of a polyolefin, a polyester, a polyamide, or combinations thereof. In accordance with certain embodiments, the polymer comprises a polypropylene, such as isotactic polypropylene.

In accordance with certain embodiments of the invention, the first nonwoven outer layer, the second nonwoven outer layer, and/or the core layer of the nonwoven fabric may comprise filaments formed from a variety of processes (e.g., spunbond, meltblown, carded, etc.) and/or a variety of synthetic or natural polymeric materials. For example, the first nonwoven outer layer, the second nonwoven outer layer, and/or the core layer of the nonwoven fabric may comprise filaments comprising a polypropylene, polyethylene, or both. In certain embodiments of the invention, for instance, the polymeric material may comprise high density polypropylene or high density polyethylene, low density polypropylene or low density polyethylene, linear low density polypropylene or linear low density polyethylene, a copolymer of polypropylene or ethylene, and any combination thereof. In some embodiments of the invention, the polymeric material may comprise at least one of a polypropylene, a polyethylene, a polyester, a polyamide, or combinations thereof. In accordance with certain embodiments of the invention, the polymeric material may comprise a biopolymer (e.g., polylactic acid (PLA), polyhydroxyalkanoates (PHA), and poly(hydroxycarboxylic) acids).

In accordance with certain embodiments of the invention, the nonwoven fabric may comprise multi-component fibers, such as bicomponent fibers having a sheath-core configuration. For example, certain embodiments of the invention may comprise bicomponent fibers comprising a sheath comprising, by way of example only, a polyethylene or a propylene and a core comprising, by way of example only, at least one of a polypropylene, a polyethylene, a polyester, or a biopolymer (e.g., polylactic acid (PLA) polyhydroxyalkanoates (PHA), and poly(hydroxycarboxylic) acids. In accordance with certain embodiments of the invention, such bicomponent fibers may be incorporated independently into the first nonwoven outer layer, the second nonwoven outer layer, and/or the core layer.

In accordance with certain embodiments of the invention, the first nonwoven outer layer, the second nonwoven outer layer, or both, may be substantially devoid of cellulosic fibers. In accordance with certain embodiments of the invention, the first nonwoven outer layer, the second nonwoven outer layer, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. Additionally or alternatively, the first nonwoven outer layer may define a first outermost surface (e.g., 115 of FIG. 1) of the nonwoven fabric and the second nonwoven outer layer may define a second outermost surface (e.g., 125 of FIG. 1) of the nonwoven fabric, in which the first outermost surface, the second outermost surface, or both may be substantially devoid of cellulosic fibers. In accordance with certain embodiments of the invention, the first outermost surface, the second outermost surface, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

In accordance with certain embodiments of the invention, the nonwoven fabric may comprise a liquid additive loaded thereon. The liquid additive, for example, may not be particularly limited according to certain embodiments of the invention. In certain embodiments of the invention, for instance, the liquid additive may comprise a lotion, soil-cleaning compositions, skin-cleaning composition, or anti-microbial composition. In this regard, certain embodiments of the invention may comprise a preloaded wet-wipe, for example being disposed within a container or package.

The nonwoven fabric, in accordance with certain embodiments of the invention, may comprise a basis weight from about 20 to about 100 gsm. The basis weight of the nonwoven fabric, according to certain embodiments of the invention, may comprise from about 40 to about 60 gsm. In certain embodiments of the invention, for example, the nonwoven fabric may comprise a basis weight from about 40 gsm to about 50 gsm.

II. Methods of Producing a Nonwoven Fabric

Figure 2:
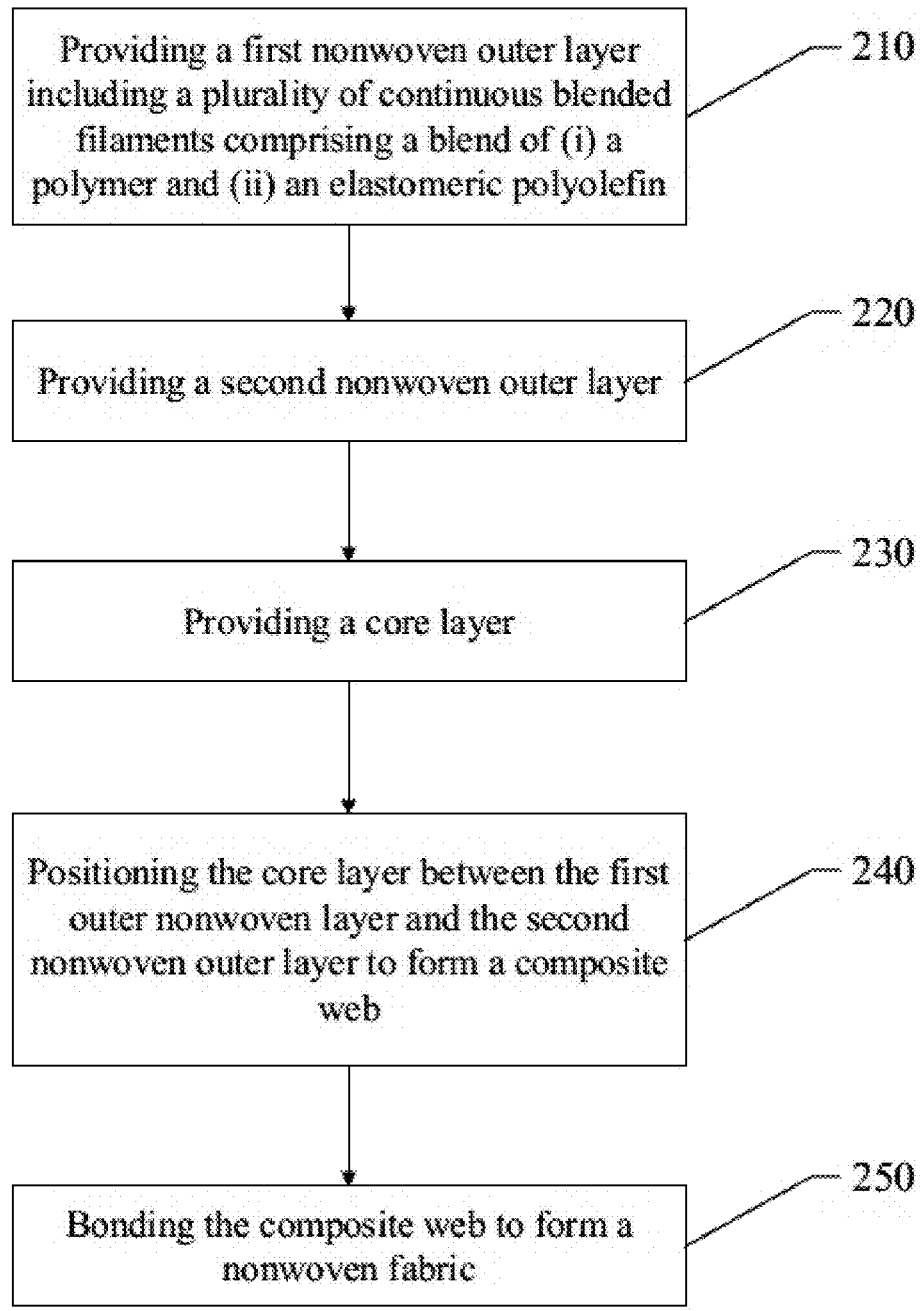
FIG. 2 illustrates a process flow diagram for forming a nonwoven fabric according to an embodiment of the invention.

In yet another aspect, the invention provides a method of forming a nonwoven fabric according to embodiments disclosed herein. FIG. 2, for example, illustrates a process flow diagram for forming a nonwoven fabric according to certain embodiments of the invention. As shown in FIG. 2, methods of forming a nonwoven fabric, in accordance with certain embodiments of the invention, may comprise steps of providing a first nonwoven outer layer including a plurality of continuous blended filaments comprising a blend of a polymer and an elastomeric polyolefin at operation 210, providing a second nonwoven outer layer at operation 220, providing a core layer at operation 230, positioning the core layer between the first nonwoven layer and the second nonwoven outer layer to form a composite web at operation 240, and bonding the composite web to form the nonwoven fabric at operation 250. It should be noted that operation 210 references continuous blended filaments as an example only, and operation 210 may comprise a plurality of continuous blended filaments and/or blended staple fibers. In accordance with certain embodiments of the invention, for instance, the first nonwoven outer layer may be formed from blended staple fibers alone, continuous blended filaments alone, or a combination of blended staple fibers and continuous blended filaments.

In accordance with certain embodiments of the invention, the step of providing a first nonwoven outer layer may comprise melt-spinning the first nonwoven layer. In accordance with certain embodiments of the invention, the step of providing a second nonwoven outer layer may comprises melt-spinning the second nonwoven layer. In accordance with certain embodiments of the invention, the step of providing a core layer may comprise melt-spinning the core layer. Methods of forming a nonwoven fabric as disclosed herein, in accordance with certain embodiments of the invention, may comprise, for example, melt-spinning the first nonwoven layer onto a forming belt, forming the core layer onto the first nonwoven outer layer, forming the second nonwoven layer onto the core layer to form a composite nonwoven, and bonding the composite nonwoven to form a nonwoven fabric as disclosed herein.

Figure 3:
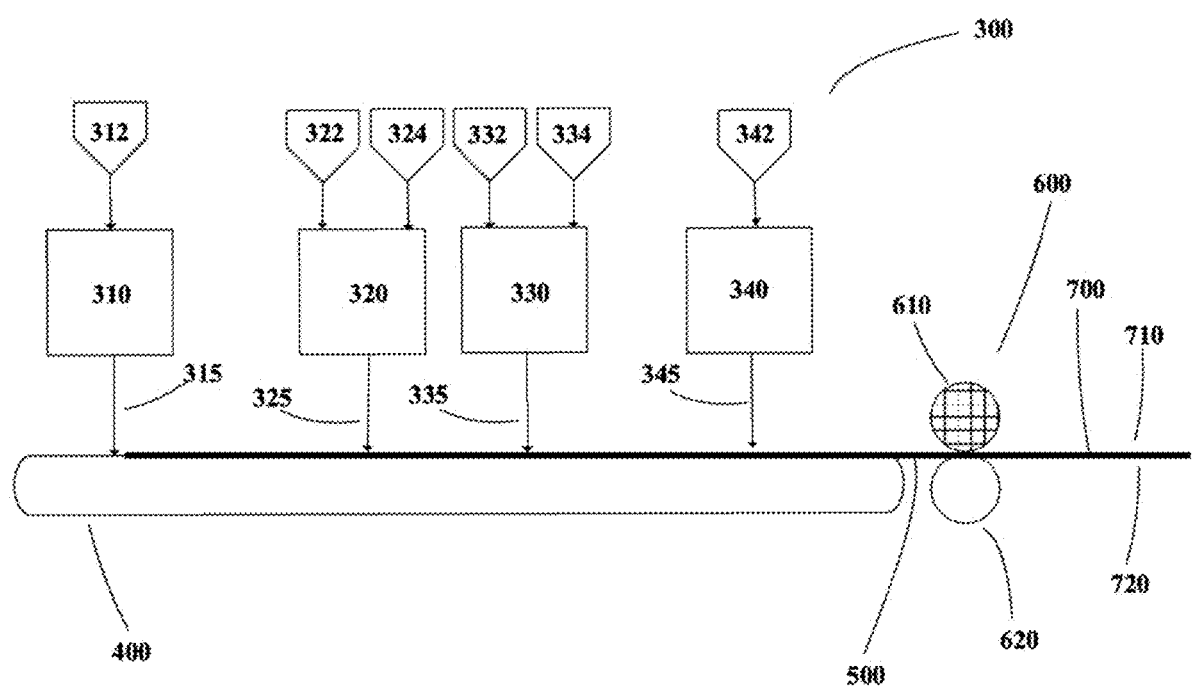
FIG. 3 shows an operational schematic illustrating a method for making a nonwoven fabric according to certain embodiments of the invention.

FIG. 3, for example, illustrates an operational schematic 300 for a method of making a nonwoven fabric according to certain embodiments of the invention. As shown in FIG. 3, a first source of molten polymer is provided 312. The polymeric melt from the first molten polymer source 312 is fed to a first beam 310 and the polymeric melt is melt-spun into a plurality of first beam filaments 315 and deposited onto a moving collection belt 400. The source of molten polymer may be the typical extrusion system found on most spunbond lines. The first beam filaments 315 will define the first nonwoven outer layer. A second source of molten polymer 324 and cellulosic fibers (e.g., wood pulp fibers) 322 are fed to second beam 320 where the molten polymer is spun into continuous filaments and combined with cellulosic fibers (e.g., wood pulp fibers) to form the flow of fibrous material 325 collected onto the collection belt 400. The source of cellulosic fibers (e.g., wood fiber) may be the typical air laid process where a sheet of wood pulp is fiberized using a hammer mill. In this regard, the second beam filaments 325 may comprise the cellulosic fibers at least partially bonded to the polymeric fibers and/or at least partially incorporated into the polymeric fibers. As shown in FIG. 3, the second beam filaments 325 may be deposited directly onto the first beam filaments 315 that have previously been deposited onto the collecting belt 400. The embodiment illustrated by FIG. 3 includes a third beam 330 fed by another source of cellulosic fiber 332 and a third source of molten polymer 334, in which the third beam 330 provides third beam filaments 335 that are deposited on top of the second beam filaments 325. In this regard, the second beam filaments and the third beam filaments may define two independent cellulosic fiber-containing layers that form the core layer of the nonwoven fabric. As shown in FIG. 3, a fourth beam 340 is provided. The fourth beam 340 is fed from a fourth source of molten polymer 342. The fourth source of molten polymer 342 includes a melt-blend comprising a blend of one or more polymers (e.g., non-elastomeric polymer) and at least one elastomeric polyolefin. In this regard, the melt-blend from the source of molten polymer 342 is fed to the fourth beam and the melt-blend is melt-spun into a plurality of fourth beam filaments 345 and deposited onto the third beam filaments 335 to define a composite nonwoven web 500. In this regard, the fourth beam filaments 345 comprise blended filaments. In this embodiment, the fourth beam filaments 345 define the second nonwoven outer layer. The composite nonwoven web 500 is passed into and/or through a thermal calendering device 600, including a patterned roll 610 and a smooth counter roll 620, to thermally bond the composite nonwoven web 500 to form the nonwoven fabric 700. The nonwoven fabric 700 includes a patterned side 710, as a result of the patterned roll 610, and a smooth side 720.

In accordance with certain embodiments of the invention, the nonwoven composite (e.g., 500 from FIG. 3) may be bonded by a variety of operations, such as thermal bonding, adhesive bonding, mechanical bonding, ultrasonic bonding, or the like. Bonding of the nonwoven composite, according to certain embodiments of the invention, may comprise thermal bonding via a calender. In this regard, the nonwoven fabric produced by methods according to certain embodiments of the invention may comprise a plurality of bonded sites, for example, in which at least a portion of the fibers at or proximate the bonding sites may be fused together or alternatively mechanically intertwined of adhered together by an adhesive component. In this regard, the bonding site or bonding sites, for example, may comprise a discrete or localized region of the nonwoven fabric that has been softened or melted and optionally subsequently or simultaneously compressed to form a discrete or localized deformation in the nonwoven fabric.

Although FIG. 3 illustrates one particular approach to forming nonwoven fabrics according to certain embodiments of the invention, certain embodiments of the invention may comprise utilizing and/or forming the nonwoven fabric by the Spinlace® process or the Arvell process, which combine cellulosic fibers (e.g., pulp) and continuous filaments by thermal bonding (without the need for hydroentanglement). In this regard, one or more of the layers of the nonwoven fabric can comprise a spunbond web or carded web, which may be thermally bonded.

In accordance with certain embodiments of the invention, for example, the core layer may comprise from about 25 wt. % to about 100 wt. % of cellulosic fibers or from about 50 wt. % to about 80 wt. % of cellulosic fibers. In accordance with certain embodiments of the invention, the core layer may comprise from at least about any of the following: 25 wt. %, 30 wt. %, 40 wt. %, 50 wt. %, 60 wt. %, 70 wt. %, and 75 wt. % of cellulosic fibers and/or at most about 100 wt. %, 99 wt. %, 95 wt. %, 90 wt. %, 85 wt. %, and 80 wt. % of cellulosic fibers (e.g., about 75-85 wt. % of cellulosic fibers, about 60-95 wt. % of cellulosic fibers, etc.). In one example embodiment according to the invention, the nonwoven fabric may comprise a core layer comprising substantially 100 wt. % of cellulosic fibers (e.g., wood pulp). In accordance with certain example embodiments of the invention, the nonwoven fabric may comprise, for example, two outer spunbond layers and a core layer comprising substantially 100 wt. % of cellulosic fibers (e.g., wood pulp). One or both of the outer spunbond layers, for example, may comprise Spinlace® layers and the core layer may comprise substantially 100 wt. % of cellulosic fibers (e.g., wood pulp).

The cellulosic fibers of the core layer, according to certain method embodiments of the invention, may comprise short and/or staple fibers. In this regard, short fibers may comprise a length, for example, of less than 0.01 meter. In accordance with certain embodiments of the invention, the method may comprise forming the core layer from one or more individual or discrete cellulosic fiber-containing layers. For example, the core layer may be formed from depositing or layering from about 1 to about 5 individual cellulosic fiber-containing layers on top of each other (e.g., 1, 2, 3, 4, or 5 individual layers). In accordance with certain embodiments of the invention, the core layer may be produced by providing or forming more than 1 individual cellulosic fiber-containing layer, including a first individual cellulosic fiber-containing layer and a second individual cellulosic fiber-containing layer in which the fiber-compositions (e.g., blends of thermoplastic fibers and cellulosic fibers) may comprise the same or different percentages of cellulosic fibers. In accordance with certain embodiments of the invention, the core layer be produced by forming or providing at least three individual cellulosic fiber-containing layers, in which one of the layers has a higher cellulosic fiber content relative to the other individual cellulosic fiber-containing layers and being located at the innermost position of the core layer.

In accordance with certain method embodiments of the invention, the core layer of the nonwoven fabric may comprise a core layer ratio between a weight percentage of cellulosic fibers to a weight percentage of polymer fibers from about 4:1 to 1:1. The core layer ratio between a weight percentage of cellulosic fibers to a weight percentage of polymer fibers, according to certain embodiments of the invention, may comprise from about 3.5:1 to 2.5:1 (e.g., 3.5:1 to 3:1). In accordance with certain embodiments of the invention, core layer ratio between a weight percentage of cellulosic fibers to a weight percentage of polymer fibers may comprise from at least about any of the following: 1:1, 1.5:1, 2:1, 2.5:1, and 3:1 and/or at most about 5:1, 4.5:1, 4:1, and 3.5:1.

In accordance with certain other embodiments of the invention, the core layer may comprise substantially 100 wt. % of a thermoplastic polymer. In this regard, the core layer according to certain embodiments of the invention may be devoid of cellulosic fibers. The nonwoven fabric, according to certain embodiments of the invention, may be devoid of cellulosic fibers. In accordance with certain embodiments of the invention, the core layer, the nonwoven fabric, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. In accordance with certain example embodiments, the nonwoven fabric may comprise a spunbond-meltblown-spunbond structure, in which the number of meltblown layers positioned between the outer spunbond layers may be varied (e.g., from 1 to about 5), and the nonwoven fabric may be devoid of any cellulosic fibers.

According to certain method embodiments of the invention, the core layer may comprise from about 60 wt. % to about 90 wt. % of the nonwoven fabric (e.g., from about 70 wt. % to about 90 wt. % of the nonwoven fabric). In accordance with certain embodiments of the invention, the core layer may comprise from at least about any of the following: 25 wt. %, 40 wt. %, 50 wt. %, 55 wt. %, 60 wt. %, 70 wt. %, and 75 wt. % of the nonwoven fabric and/or at most about 95 wt. %, 90 wt. %, 85 wt. %, and 80 wt. % of the nonwoven fabric.

In accordance to certain method embodiments of the invention, the resulting nonwoven fabric may comprise at least the first nonwoven outer layer including blended filaments (e.g., continuous blended filaments and/or blended staple fibers) comprising a blend of a polymer and an elastomeric polyolefin, in which the blended filaments comprise from about 10 wt. % to about 75 wt. % of the elastomeric polyolefin. In accordance with certain embodiments of the invention, the blended filaments (e.g., continuous blended filaments and/or blended staple fibers) may comprise from about 20 wt. % to about 50 wt. % of the elastomeric polyolefin. In accordance with certain embodiments of the invention, the blended filaments (e.g., continuous blended filaments and/or blended staple fibers) may comprise from about 30 wt. % to about 40 wt. % of the elastomeric polyolefin (e.g., about 35 wt. % of the elastomeric polyolefin). In accordance with certain embodiments of the invention, each of the first nonwoven outer layer and the second nonwoven outer layer comprise blended filaments (e.g., continuous blended filaments and/or blended staple fibers) comprising a blend of a polymer and an elastomeric polyolefin, in which the blended filaments (e.g., continuous blended filaments and/or blended staple fibers) comprise from about 10 wt. % to about 75 wt. % of the elastomeric polyolefin (e.g., from about 20 wt. % to about 50 wt. % of the elastomeric polyolefin, from about 30 wt. % to about 40 wt. % of the elastomeric polyolefin, about 35 wt. % of the elastomeric polyolefin). In accordance with certain embodiments of the invention, the blended filaments (e.g., continuous blended filaments and/or blended staple fibers)

of the first and/or second nonwoven outer layers may independently comprise from at least about any of the following: 10 wt. %, 15 wt. %, 20 wt. %, 25 wt. %, 30 wt. %, 35 wt. %, and 40 wt. % of the elastomeric polyolefin and/or at most about 85 wt. %, 80 wt. %, 75 wt. %, 70 wt. %, 65 wt. %, 60 wt. %, 55 wt. %, and 50 wt. % of the elastomeric polyolefin. In accordance with certain embodiments of the invention, the elastomeric polyolefin comprises copolymers of propylene and ethylene. In certain embodiments of the invention, for example, the elastomeric polyolefin may comprise polypropylene microcrystalline regions and random ethylene amorphous regions.

In accordance with certain method embodiments of the invention, the first nonwoven outer layer, the second nonwoven outer layer, or both, may comprise continuous filaments (e.g., spunbond filaments). For instance, the blended filaments may comprise filaments formed by a spunbond process. In accordance with certain embodiments of the invention, at least one of the first nonwoven outer layer and the second nonwoven outer layer may include a plurality of blended filaments (e.g., continuous blended filaments and/or blended staple fibers) comprising a blend of a polymer and an elastomeric polyolefin, in which the polymer comprises at least one of a polyolefin, a polyester, a polyamide, or combinations thereof. In accordance with certain embodiments, the polymer comprises a polypropylene, such as isotactic polypropylene.

In accordance with certain method embodiments of the invention, the first nonwoven outer layer, the second nonwoven outer layer, and/or the core layer of the nonwoven fabric may comprise filaments formed from a variety of processes (e.g., spunbond, meltblown, carded, etc.) and/or a variety of synthetic or natural polymeric materials. For example, the first nonwoven outer layer, the second nonwoven outer layer, and/or the core layer of the nonwoven fabric may comprise filaments comprising a polypropylene, polyethylene, or both. In certain embodiments of the invention, for instance, the polymeric material may comprise high density polypropylene or high density polyethylene, low density polypropylene or low density polyethylene, linear low density polypropylene or linear low density polyethylene, a copolymer of polypropylene or ethylene, and any combination thereof. In some embodiments of the invention, the polymeric material may comprise at least one of a polypropylene, a polyethylene, a polyester, a polyamide, or combinations thereof. In accordance with certain embodiments of the invention, the polymeric material may comprise a biopolymer (e.g., polylactic acid (PLA), polyhydroxyalkanoates (PHA), and poly(hydroxycarboxylic) acids).

In accordance with certain embodiments of the invention, the nonwoven fabric may comprise multi-component fibers, such as bicomponent fibers having a sheath-core configuration. For example, certain embodiments of the invention may comprise bicomponent fibers comprising a sheath comprising, by way of example only, a polyethylene or a propylene and a core comprising, by way of example only, at least one of a polypropylene, a polyethylene, a polyester, or a biopolymer (e.g., polylactic acid (PLA) polyhydroxyalkanoates (PHA), and poly(hydroxycarboxylic) acids). In accordance with certain embodiments of the invention, such bicomponent fibers may be incorporated independently into the first nonwoven outer layer, the second nonwoven outer layer, and/or the core layer.

In accordance with certain method embodiments of the invention, the first nonwoven outer layer, the second nonwoven outer layer, or both, may be substantially devoid of cellulosic fibers. In accordance with certain embodiments of the invention, the first nonwoven outer layer, the second nonwoven outer layer, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %. Additionally or alternatively, the first nonwoven outer layer may define a first outermost surface (e.g., 115 of FIG. 1) of the nonwoven fabric and the second nonwoven outer layer may define a second outermost surface (e.g., 125 of FIG. 1) of the nonwoven fabric, in which the first outermost surface, the second outermost surface, or both may be substantially devoid of cellulosic fibers. In accordance with certain embodiments of the invention, the first outermost surface, the second outermost surface, or both, may comprise an amount of cellulosic fibers of no more than about 15 wt. %, no more than about 10 wt. %, no more than 5 wt. %, no more than 3 wt. %, no more than 2 wt. %, no more than 1 wt. %, no more than 0.5 wt. %, or no more than 0.1 wt. %.

In accordance with certain method embodiments of the invention, the method may further comprise adding and/or incorporating a liquid additive loaded into or on the nonwoven fabric. The liquid additive, for example, may not be particularly limited according to certain embodiments of the invention. In certain embodiments of the invention, for instance, the liquid additive may comprise a lotion, soil-cleaning compositions, skin-cleaning composition, or antimicrobial composition. In this regard, certain embodiments of the invention may comprise a preloaded wet-wipe, for example being disposed within a container or package The nonwoven fabric, in accordance with certain embodiments of the invention, may comprise a bases weight from about 20 to about 100 gsm. The basis weight of the nonwoven fabric, according to certain embodiments of the invention, may comprise from about 40 to about 60 gsm. In certain embodiments of the invention, for example, the nonwoven fabric may comprise a basis weight from about 40 gsm to about 50 gsm.

III. Examples

The present disclosure is further illustrated by the following examples, which in no way should be construed as being limiting. That is, the specific features described in the following examples are merely illustrative and not limiting.

It is known that tactile properties related to a slick or slippery feel of a wet wipe can be predicted by testing the coefficient of friction (COF) of a fabric against itself. It is also believed that some of the wiping performance including streaking can also be predicted, at least in part, by the COF for a given wipe.

Samples of nonwoven fabrics (e.g., composites) were made using a process as shown in FIG. 3. In this process, continuous filaments produced by beams 1 (e.g., 310 from FIG. 3) and 4 (e.g., 340 from FIG. 3) formed the outermost layers of the fabric while the continuous filaments made by beams 2 and 3 (e.g., 320 and 330 from FIG. 3) are married with wood fibers to form the core layer of the fabric. This process is also known as the Arvell technology and consists of intermingling and somewhat bonds wood fibers with continuous filaments to form a middle layer or absorbent core (i.e., the "product" from beams 2 and 3), while layers of continuous filaments form the outer skins capturing or sandwiching there-between the core layer. Sandwiching the core layer between the outermost layers of continuous filaments helps to reduce shedding of wood fibers. All of the samples were made using spinnerets that produced thermoplastic filaments with a bilobal cross section. The resulting structure (e.g., composite web from beams 1 through 4) was subsequently thermally bonded using a low bond area calendering process.

Sample 1

Sample 1 had a basis weight of 50 gsm and, it was made by the process described above by first having the beam 1 (e.g., 310 from FIG. 3) deposit on the collection belt a 4.75 gsm layer of continuous filaments made from 25 MFR (ISO 1133, 230° C./2.16 kg) polypropylene. On top of that layer, the core layers were deposited by beams 2 and 3 (e.g., 320 and 330 from FIG. 3), in which each of these beams produced a layer made from 4.75 gsm of a propylene based polyolefin and 15.5 gsm of wood pulp fibers. Finally, beam 4 (e.g., 340 from FIG. 3) was used to deposit another layer of continuous filament made from 35 wt. % Vistamaxx™ VM-2125 sold by ExxonMobil and 65 wt. % spunbond grade polypropylene. The composite web formed from beams 1 through 4 was then bonded by calendering. It should be noted that the top layer of the composite web (e.g., the layer comprising the Vistamaxx™ VM-2125) was positioned against the patterned roll of the calender while the other side of the composite web that was free of Vistamaxx™ VM-2125 was positioned against the smooth roll during the bonding by the calender. The continuous filaments from beam 1 and 4 (e.g., 310 and 340 from FIG. 3) were made from spinnable grade propylene based polyolefin selected for their adhesion with the wood fibers. Finally, the wood fibers provided to beams 2 and 3 (e.g., 320 and 330 from FIG. 3) consisted of wood fibers made from the Stora Fluff ECF soft wood sulphate treated pulp sheet sold by Stora Enso Biomaterials, P.O. Box 12386 NL-1100 AJ Amsterdam.

Sample 2

Sample 2 was made by speeding up the collection belt for the process that was used to make Sample 1 in a manner that reduced the basis weight of the nonwoven fabric to 45 gsm. The ratio between the weights of the layers or the ratio between the ingredients remained the same as those set forth in Sample 1.

Comparative Sample 1 (C1)

This comparative sample was also made by the process described above. The throughputs and belt speeds were set to produce a nominal basis weight of 50 gsm. For this comparative sample, the outer layers (beams 1 and 4) consisted of continuous filaments spun from a blend comprising 92% of a 25 MFR (ISO 1133, 230° C./2.16 kg) polypropylene and 8% of a calcium carbonate masterbatch (80% loading of calcium carbonate). Each of these layers had a basis weight of about 4.75 gsm or, represent about 9.5% of the total basis weight of the nonwoven fabric. The composition of beams 2 and 3 (e.g., 320 and 330 from FIG. 3) consisted respectively of about 4.75 gsm of continuous propylene based polyolefin filaments and 15.5 gsm of wood pulp fibers. This process produced a structure were the two outer layers each represent 9.5% of the total basis weight of the nonwoven fabric while the core produced by the combination of beams 2 and 3 (e.g., 320 and 330 from FIG. 3) accounted for 81% by weight of this comparative sample.

Comparative Sample 2 (C2)

Comparative sample 2 was made by speeding up the collection belt for the process that made Comparative Sample 1 in a manner that reduced the basis weight to 45 gsm. The ratio between the weights of the layers or the ratio between the ingredients remained the same as those of Comparative Sample 1.

Comparative Sample 3 (C3)

Comparative sample 3 was made by speeding up the collection belt for the process that made Comparative Sample 1 in a manner that reduced the basis weight to 40 gsm. The ratio between the weights of the layers or the ratio between the ingredients remained the same as those of Comparative Sample 1.

Comparative Sample 4 (C4)

Comparative sample 4 had a basis weight of about 50 gsm and was made using a process fairly similar to the one used for the preceding comparative samples; however, for this comparative sample while the core layers were a blend of wood fibers and polyolefin filaments, the two outer layers of continuous filaments were made from spunpond grade polypropylene. This comparative sample was included as a baseline sample that is free of Vistamaxx™ or calcium carbonate on both exposed surfaces of the material.

The samples and comparative samples were tested for the following properties: basis weight as per ASTM D 3776; tensile strength and elongation at peak as per ASTM D 5035 using the 50 mm wide strips; and static and kinetic coefficient of friction ("COF") as per ASTM D1894. For testing, the sled was wrapped in the sample or comparative sample and the flat surface was also covered by the sample or comparative sample. Of note, both sides of the sample or comparative sample were tested against themselves: the side facing the pattern roll (P) vs. the same side (itself) and, the side facing the smooth roll (S) against itself. Also, the samples or comparative samples for the wet testing were saturated in water by immersion and hung to drip for 1 minute before testing.

The test results can be found in Table 1, Table 2, and Table 3.

TABLE 1

| Sample | Basis Weight Gsm | Tensile strength MD N/50 mm | Tensile strength CD N/50 mm | Elongation at peak MD % | Elongation at Peak CD % |
|---|---|---|---|---|---|
| C1 | 50.8 | 23.4 | 9.3 | 31 | 33 |
| C2 | 45.9 | 18.3 | 8.0 | 34 | 29 |
| C3 | 39.7 | 15.3 | 8.4 | 40 | 45 |
| C4 | 50.8 | 24 | 11.9 | 37 | 44 |
| 1 | 51.5 | 16.2 | 9.6 | 33 | 39 |
| 2 | 45.4 | 16.0 | 7.5 | 35 | 35 |

TABLE 2

| | | Dynamic Coefficient of Friction (COF) | | | | |
|---|---|---|---|---|---|---|
| | Basis weight | Dry | | Wet | | Ratio of wet COF for P |
| Sample | gsm | P to P | S to S | P to P | S to S | to P vs. S to S |
| C1 | 50.8 | 0.65 | 0.46 | 0.54 | 0.67 | 0.81 |
| C2 | 45.9 | 0.64 | 0.62 | 0.55 | 0.71 | 0.77 |
| C3 | 39.7 | 0.61 | 0.58 | 0.56 | 0.60 | 0.93 |
| C4 | 50.8 | 0.67 | 0.58 | 0.53 | 0.41 | 1.29 |
| 1 | 51.5 | 0.91 | 0.65 | 0.76 | 0.55 | 1.38 |
| 2 | 45.4 | 0.89 | 0.59 | 0.83 | 0.70 | 1.19 |

A first observation for the dry or wet dynamic COF is that the "P" side (i.e., the side of the nonwoven fabric containing the Vistamaxx™ VM-2125 for Samples 1 and 2 and positioned against the patterned roll) exhibited significantly higher values than the "S" side (i.e., the outermost side of the nonwoven fabric being devoid of Vistamaxx™ VM-2125 and being positioned against the smooth roll) for the same samples. For the dry test, for example, a gain of about 45% on average for the "P" side vs. the "S" side was realized. For the wet test, this gain was about 27% for the "P" side vs. the "S" side. A second observation, for instance, is that the "P" side for Samples 1 and 2 also exhibited higher dry or wet dynamic COF when compared to the "P" or "S" sides for the baseline sample (i.e., C4). A third observation from the data summarized above, includes that adding Vistamaxx™ VM-2125 increased the dry or wet dynamic COF more than the addition of calcium carbonate filler.

TABLE 3

| Sample | Basis weight Gsm | Static Coefficient of Friction (COF) | | | | Ratio of wet COF for P to P vs. S to S |
|---|---|---|---|---|---|---|
| | | Dry | | Wet | | |
| | | P to P | S to S | P to P | S to S | |
| C1 | 50.8 | 0.77 | 0.68 | 0.62 | 0.76 | 0.82 |
| C2 | 45.9 | 0.73 | 0.74 | 0.62 | 0.75 | 0.83 |
| C3 | 39.7 | 0.72 | 0.73 | 0.61 | 0.70 | 0.87 |
| C4 | 50.8 | 0.77 | 0.81 | 0.60 | 0.45 | 1.33 |
| 1 | 51.5 | 1.01 | 0.85 | 0.81 | 0.62 | 1.31 |
| 2 | 45.4 | 1.03 | 0.81 | 0.90 | 0.71 | 1.27 |

The results for the static COF, summarized in Table 3, also illustrate the benefit of adding Vistamaxx™ VM-2125. For example, the gain for the "P" side vs. the "S" side for Samples 1 and 2 were about 23% for the dry test and 28% for the wet test. The gain was even more pronounced when the "P" side of Samples 1 and 2 were compared to both side of Comparative Sample C4. In summary, these results clearly show that adding an elastomeric polyolefin to the filaments forming the outer layer of a nonwoven fabric (e.g., a wet wipe) will increase the COF friction of this wipe against itself and, we know that such a higher COF is desirable to reduce the perception of slipperiness of such wipe as well as improving some aspects of its wiping performance. In this regard, the incorporation of the elastomeric polyolefin to the filaments forming the outer layer helping to make them be perceived by a user as being notably closer to a wipe containing cellulosic fibers in their exposed sides (i.e., outermost sides).

Based on the foregoing testing of wetted wipe samples, it should be clear that the addition of an elastomeric polyolefin to the polypropylene-based composition of the thermoplastic filaments forming the great majority of an outer layer, in accordance with certain embodiments of the invention, of a wet wipe significantly improves the COF for that side vs. the side of the wipe that did not include the elastomeric polyolefin.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A nonwoven fabric, comprising:
   a first nonwoven outer layer;
   a second nonwoven outer layer; and
   a core layer located between the first nonwoven layer and the second nonwoven outer layer, the core layer consists of cellulosic fibers;
   wherein the first nonwoven outer layer and the second nonwoven outer layer each consist of a plurality of blended staple fibers comprising a blend of (i) a polymer and (ii) an elastomeric polyolefin; wherein the polymer and the elastomeric polyolefin are different; and
   wherein the first nonwoven outer layer, the second nonwoven outer layer, and the core layer are mechanically consolidated together, and
   wherein a total fiber content of the nonwoven fabric consists of the plurality of blended fibers and the cellulosic fibers.

2. The nonwoven fabric of claim 1, wherein the blended staple fibers comprise from about 10 wt. % to about 75 wt. % of the elastomeric polyolefin.

3. The nonwoven fabric of claim 1, wherein the elastomeric polyolefin comprises copolymers of propylene and ethylene.

4. The nonwoven fabric of claim 1, wherein the polymer of the plurality of blended staple fibers of at least one of the first nonwoven outer layer and the second nonwoven outer layer comprises at least one of a polyolefin, a polyester, a polyamide, or combinations thereof.

5. The nonwoven fabric of claim 1, wherein the nonwoven fabric comprises a liquid additive.

6. The nonwoven fabric of claim 1, wherein the polymer comprises a biopolymer.

7. The nonwoven fabric of claim 6, wherein the biopolymer comprises a polylactic acid, a polyhydroxyalkanoate, or a combination thereof.

8. The nonwoven fabric of claim 1, wherein the nonwoven fabric is provided in the form of a wipe and the wipe comprises a wet-wipe including a liquid cleaning composition.

9. The nonwoven fabric of claim 8, wherein the liquid cleaning composition comprises an antimicrobial composition.

10. The nonwoven fabric of claim 1, wherein the nonwoven fabric is a wipe that is disposed within a container.

11. The nonwoven fabric of claim 6, wherein the biopolymer is a polylactic acid.

12. The nonwoven fabric of claim 1, wherein the second nonwoven outer layer comprises a plurality of bicomponent fibers.

13. The nonwoven fabric of claim 12, wherein the plurality of bicomponent fibers include a sheath component and a core component comprising a polylactic acid.

14. The nonwoven fabric of claim 1, wherein the nonwoven fabric has an elongation at peak per ASTM D 5035 using the 50 mm wide strips in a machine direction of 35% or below.

15. The nonwoven fabric of claim 1, wherein the first nonwoven outer layer, the second nonwoven outer layer, and the core layer are hydroentangled together.

* * * * *